Figure 3:
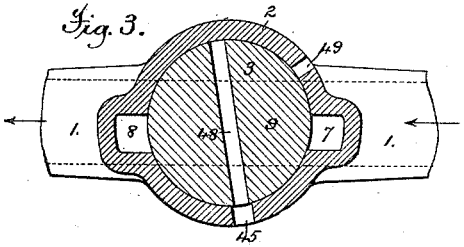

(No Model.)

B. S. CHURCH.
METHOD OF AND APPARATUS FOR DETECTING THE RATE OF WATER CONSUMPTION.

No. 302,620. Patented July 29, 1884.

Attest:
Geo. H. Graham
A. N. Jasbera

Inventor,
Benj. S. Church,
by Munson & Philipp
Attys.

N. PETERS. Photo-Lithographer. Washington, D. C.

UNITED STATES PATENT OFFICE.

BENJAMIN S. CHURCH, OF SCARBOROUGH, NEW YORK.

METHOD OF AND APPARATUS FOR DETECTING THE RATE OF WATER-CONSUMPTION.

SPECIFICATION forming part of Letters Patent No. 302,620, dated July 29, 1884.

Application filed December 19, 1883. (No model.) Patented in England May 1, 1883, No. 2,217.

*To all whom it may concern:*

Be it known that I, BENJAMIN S. CHURCH, a citizen of the United States, residing in the town of Scarborough, county of Westchester, and State of New York, have invented certain new and useful Improvements in the Method of and Apparatus for Detecting the Rate of Water-Consumption, fully described and represented in the following specification, and the accompanying drawings, forming a part of the same.

It is well known that in those cities and towns where water is supplied through a system of mains great waste is occasioned by the negligence of users in leaving cocks and valves open more than is necessary, and particularly by the practice of allowing the water to flow in cold weather, to prevent freezing and the consequent bursting of pipes. A simple and reliable apparatus, by which those having charge of the water-supply can, without entering the building or other place where water is used, gain comparatively accurate information of the quantity of water which is being used at any time during the day or night, is therefore very desirable. In United States Letters Patent No. 241,619, I have described a method of and apparatus for accomplishing this purpose, by ascertaining the difference between the statical and dynamical pressures in the service-pipe leading from the main to the building or other place where water is used. It has been found in practice, however, that when the service-pipe is of the usual size and very little water is being drawn, the dynamical pressure so nearly equals the statical pressure that the gage used for indicating the difference is not sufficiently delicate to make a satisfactory record.

It is the object of the present invention, among other things, to overcome this difficulty; and to that end one feature of the invention consists, broadly, in a method of temporarily increasing the difference in these pressures, so as to enable the gage to make a more accurate and satisfactory record.

The invention also embraces an apparatus for carrying this method into practice, and also various details of construction, singly and in combination, all of which will be hereinafter fully described and particularly pointed out.

It is a well-known law of physics that the pressure exerted by a column of water flowing through a pipe under a given head is in inverse ratio to the rapidity with which it is drawn from such pipe. If, therefore, the service-pipe through which the water is conducted into a building is of large size, and only a small stream is being drawn or leaking from the pipe inside the building, the water will be drawn from the pipe so slowly that the dynamical pressure will vary only slightly from the statical pressure, and a very delicate apparatus will be required to detect the difference. If, however, the service-pipe be very small, then a small stream running from the pipe inside the building will draw the water from the pipe so rapidly that the difference between the dynamical and statical pressures will be plainly indicated by an ordinary gage.

It is this principle which I have invoked in the present invention; and to make it available I, in effect, reduce the service-pipe at the time of taking the dynamical pressure to a very small diameter, thereby obtaining all the advantages of the principle, even when dealing with the largest of pipes.

Figure 1:
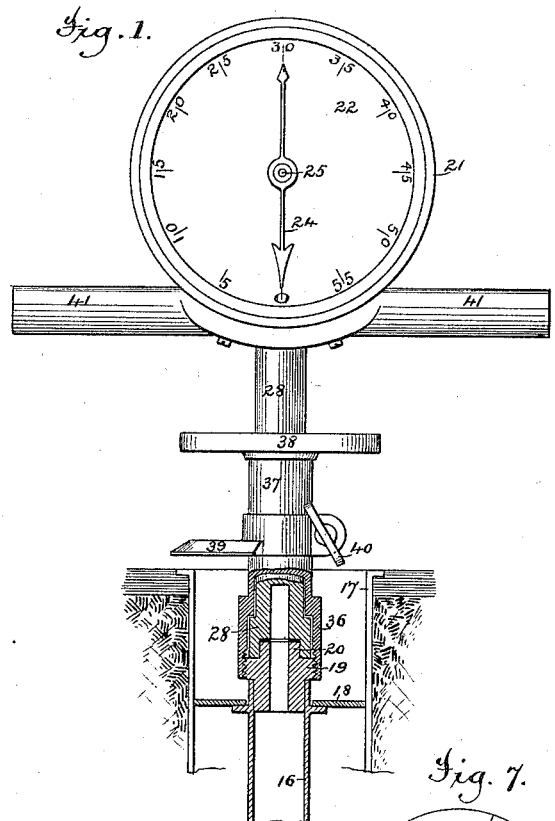
Figure 2:
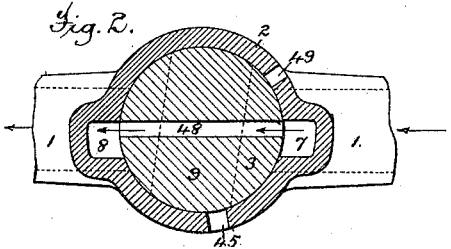
Figure 4:
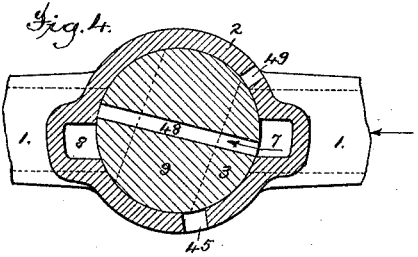
Figure 5:
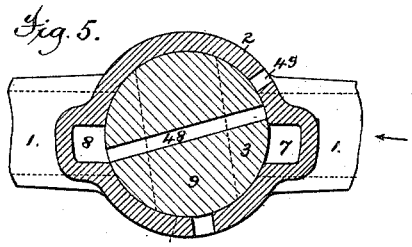
Figure 7:
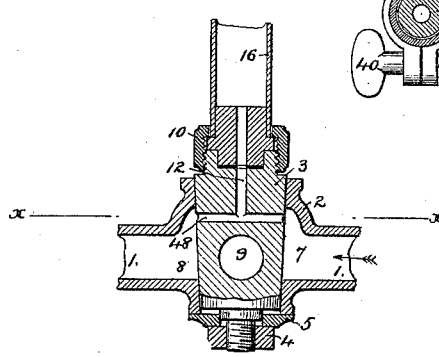
Figure 6:
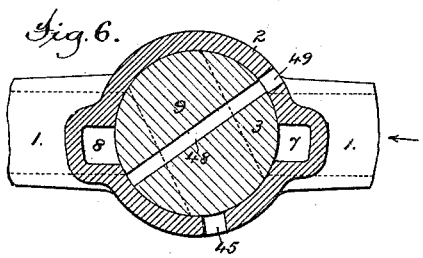

In the accompanying drawings, Figure 1 is a front elevation, partly in section, of an apparatus embodying the present invention, the parts being shown in position for taking the dynamical pressure. Fig. 2 is an enlarged horizontal section of the same, taken upon the line *x x*. Figs. 3, 4, 5, and 6 are like views showing the parts in different positions; and Fig. 7 is a plan view of the index for indicating the relative positions of the parts.

Referring to said drawings, it is to be understood that 1 is the usual service-pipe for conducting the water from the street-main to the place of use, the water flowing in the direction indicated by the arrows. This pipe, at some convenient point outside of the building, is provided with a cock of peculiar construction, by the use of which the person in charge of the water-supply is enabled to take the statical and dynamical pressures in the pipe, and thus determine the rate of consumption. This cock consists of the usual shell, 2, and plug 3, the latter being held in position by the usual nut and washer, 4 5, at its lower end. The shell 2 is provided with induction and eduction ports 7 8, and the plug 3 is provided with transverse ducts 9 48, the latter being very much smaller than the former, and arranged at substantially right angles thereto. The plug is also provided with a longitudinal duct, 12, which extends downward from its top and unites with the duct 48, as shown in Fig. 1. The plug 3 is provided with a tubular extension, 16, which is inclosed in a suitable casing, 17, and extends upward to a point near the surface of the ground or pavement, said extension being rigidly connected to the plug in any suitable manner, as by the screw-coupling 10. (Shown in Fig. 1.) The casing 17 will preferably be provided near the top with a cross-partition, as 18, which will fit snugly around the tube 16, so as to prevent dirt and other matter from falling to and accumulating in the bottom of the casing around the cock. The upper end of the tube 16 is provided with a screw-threaded portion, 19, and a small polygonal projection, 20, the purpose of which will hereinafter appear.

Any of the common forms of pressure-gages may be used in connection with this cock apparatus for ascertaining the statical and dynamical pressures in the pipe 1, and the dial of such gage may be graduated to indicate the pressure in pounds; or, if preferred, it may be graduated to indicate velocity or gallons, after actual trial, of the water flowing per hour. In Fig. 1, I have shown a form of gage suitable for the purpose, and also means by which the gage can be readily attached to and detached from the cock apparatus before and after taking the measurements. The gage here shown consists of a cylindrical casing, 21, provided with a graduated dial, 22, and a pointer, 24, said pointer being mounted upon a shaft, 25, which passes through the casing and is rocked to move the pointer either by devices such as shown in United States Letters Patent No. 241,619, or by means of a Bourdon spring connected to the tubular standard 28 of the gage. The standard 28 is provided at its lower end with a polygonal recess adapted to receive the projection 20, and with a screw-coupling, 36, by which it may be secured to the tube 16. The coupling 36 is provided with an upwardly-extending sleeve, 37, carrying at its upper end a small hand-wheel, 38, by which the coupling can be operated to connect and disconnect the gage. The gage apparatus will preferably be provided with laterally-projecting handles, as 41, and also with an index, 39, (the purpose of which will hereinafter appear,) which is adjustably secured to the sleeve 37 by means of a spring-collar and set-screw 40, as shown in Figs. 1 and 7.

In using my invention when embodied in the apparatus just described, each service-pipe from the street-main to a house or other place where water is used, should be provided with a cock, 2 3, and tubular extensions 16, substantially as above described, the cock being placed under the sidewalk and the tubular extension extending upward to or near to the surface of such sidewalk, so that the gage can be readily attached to and detached from the cock apparatus, thus enabling the inspector to use one gage with all the cocks.

The operation of the apparatus just described is as follows: When the parts are in their normal position, so as to allow the water to enter the building or other place where it is used, the plug 3 of the cock is in the position shown in Fig. 3, so that the duct 9 communicates with both the ports 7 8, which allows the full volume of water to flow through the pipe 1. When it is desired to discover whether water is being used or wasted, and the rate of such use or waste at any time during the day or night, the gage is connected to the tube 16 by placing the standard 28 over the projection 20, and turning the hand-wheel 38 so as to operate the coupling 36. When the connection has been thus made an indicating-mark will be made upon the pavement or the edge of the casing 17, and the index 39 will be adjusted and secured upon the sleeve 37 in such position that its point N will coincide with said mark, and the plug 3 will be turned (which may be accomplished by the handles 41) until the point S upon the index coincides with said mark upon the pavement, which will bring the parts into the position shown in Fig. 4, one end of the duct 48 opening into the port 7, while the other end of said duct and both ends of the duct 9 are closed by the solid walls of the shell 2. No water can now pass through the duct 9, and the full head or pressure of the water in the pipe 1, or what I have termed the "statical pressure," will be transmitted through the ducts 48 12 into the tube 16, thereby compressing the air in said tube, which pressure will be communicated through the standard 28 to the spring or other device for operating the pointer 24, which will thus be made to move over the dial 22 and indicate the amount of the statical pressure. When the pointer 24 comes to rest, the reading will be taken, and the standard 28 will then be turned until the point D of the index 39 coincides with the mark upon the pavement, which will bring the parts into position shown in Figs. 1 and 2, in which position the duct 9 will still be closed by the solid walls of the shell 2, while the duct 48 will open into both the ports 7 and 8, so that the water will be permitted to flow freely through the pipe 1, and at the same time upward through the duct 12 toward the gage. The pressure now communicated to the gage will be the dynamical pressure or the pressure of the moving column of water in the pipe 1. If no water is being drawn from the pipe 1, the pointer 24 will in this case assume the same position as in the former; but if water is being drawn, the pressure will be less and the pointer will stop at a less advanced position, and this difference will, by proper computation, determine the rate at which the water is being drawn from the pipe. It will be observed that by reason of the difference in size of the ducts 9 and 48 the area of the passage through the plug 3 is very much reduced when the parts are in this position, thus in effect reducing the size of the service-pipe from this point onward. From this reduction in the size of the service-pipe it results that the water will flow with an increased velocity, and that, upon the principle already explained, the difference between the statical and dynamical pressures will be so increased as to be clearly indicated by the gage, even though very little water is being drawn from the service-pipe.

By the operation thus far described the rate of consumption or waste of water in any particular building or series of buildings supplied through a single service-pipe can be readily determined. It frequently happens, however, that it is desirable not only to determine the rate of waste or consumption in a building, but also to determine the particular part of the building in which the water is being used or wasted. If, therefore, upon marking the tests just explained, it is found that water is being used or wasted in the building, the part of the building in which the use or leak is taking place can be determined by turning the standard 28 until the mark H upon the index 39 coincides with the mark upon the pavement. This will bring the parts to the position shown in Fig. 5, the duct 9 being still closed while the duct 48 opens into the port 8. When the parts are in this position, all flow of water through the pipe 1 will be shut off and the pressure communicated to the gage will be that of the column of water in the pipe between the cock and the point of its termination in the building. The amount of this pressure will of course depend upon the height of the column of water, and the height of the column will depend upon the part of the building in which the leak or the cock from which the water is running is located, as any leak in the pipe will empty the pipe above the point of the leak. When, therefore, the pointer comes to rest, the pressure indicated by the gage will determine the altitude of the column of water in the house, and consequently the location of the leak or the cock from which the water is running. If the pipe is leaking at more than one point, or more than one cock is open, the pointer will indicate a gradual but irregular reduction in the pressure from the building, and the points at which these irregularities occur will determine the position of the several leaks or cocks. By this means it will be seen that any leak, however small, will be detected, although such leak may not be sufficient to show a difference between the statical and dynamical pressures. If, after making the tests just described, it is desired to shut the water off from the building or other place of use, the standard 28 will be turned until the point 0 of the index 39 coincides with the mark upon the pavement which will bring the parts into the position shown in Fig. 6, in which position the duct 9 will still be closed by the solid walls of the shell 2, while the duct 48 will coincide with the opening 49, so that any water which may remain in said duct and the duct 12 will run out into the casing 17, and thus prevent freezing, &c. If it is not desired to shut the water off, the parts will be restored to their normal position, as shown in Fig. 3, in which position the duct 48 will coincide with the opening 45, so as to allow the water to escape from the ducts 48 12. After the proper tests have been thus made, the indicating apparatus will be uncoupled from the tube 16 and applied to the testing-cock of another service-pipe, and so the operation will be repeated. It is obvious that the indicating apparatus can be connected to the tube 16 by any convenient device, as a bayonet-joint or other well-known coupling, and that said tube can be connected to the plug by other means than those shown, or be made a part of such plug, without departing from my invention.

Although I prefer to make the tube 16 of such size as to afford a considerable air-chamber in its interior, yet this chamber can be dispensed with and a mere passage-way made for the water to the indicating device. I prefer, however, to use the chamber, as by it the water is prevented from entering the indicating device, and is also forced out by the compressed air when the plug is turned, as in Figs. 3 and 6.

It will sometimes be found desirable to provide the indicating apparatus with means by which it can be ascertained whether or not the inspector has performed his duty by making the required tests upon all the service-pipes in his district, and also at what time such tests were made. This can be done by locating a clock or watch movement inside the casing 21, said movement being provided with a revolving dial so positioned that each time the pointer 24 is moved it will receive a mark from a pencil carried or operated by some moving part inside the casing. From this arrangement it will result that each time pressure is applied to the gage a mark will be made upon the dial, and the number and position of such marks will indicate the number and times of the tests made by the apparatus.

From the description given above of the construction and operation of my apparatus, it will be seen that it is adapted to afford the desired indications more conveniently and accurately than the apparatus shown in my former Letters Patent, before referred to, such accuracy being secured chiefly by limiting or reducing the area of the passage through which the supply of water is conducted, and thereby increasing its absolute velocity and the difference in the dynamical and statical pressures.

As the reduction in the size of the water-passage through the testing-cock is one of the chief objects of construction herein illustrated, it is obvious that any mode of construction capable of effecting that result may be adopted without departing from the principle of my invention. For instance, a slide-valve may be used in place of a rotating cock, and the reduction in the area of the water-passage effected by moving the slide a fixed amount, so that the resulting aperture may harmonize with the graduations of the dial, which would be made after a test with the slide in such fixed position. In such a construction, separate ducts provided with separate stop-cocks, would be required to transmit the statical and dynamical pressures to the gage; but the test would be conducted in the manner described for the testing-cock shown in the drawings. It will also be seen that the arrangement of the ports and ducts may be considerably modified from that shown, without departing from the principle or losing the advantages of the invention.

Although the method and apparatus hereinbefore described are especially designed for use in ascertaining the rate at which the water is being drawn from a service-pipe, they will also be found of great utility in detecting and locating leaks in the various mains. The course pursued when this is to be done will be as follows: All outlets leading from the main which is to be tested will be closed, as will also the large gate or cock at the entrance to said main. A small by-pass containing one of the testing-cocks will then be placed around said gate or cock. The gage will then be applied to the testing-cock and the statical and dynamical pressures taken in the manner already described. If no water is leaking from the main, these pressures will of course be equal, while, if water is leaking, the difference in the pressures will indicate the amount, and the position of the leak will be determined by tests made at different points.

What I claim is—

1. The herein-described method of determining the rate of waste or consumption of water, which consists in ascertaining, by the use of a suitable gage and connections, the difference between the pressure of the water in the service-pipe or main when the same is wholly closed and its pressure when the same is partially closed, substantially as described.

2. The herein-described method of determining the rate and location of waste or consumption of water, which consists in ascertaining, by the use of a suitable gage and connections, the difference between the statical and dynamical pressures in the service-pipe or main and the back pressure from the house or other place of use when said pipe or main is closed, substantially as described.

3. The combination, with a water-pipe, as 1, and a gage, as 21, of means for wholly and for partially closing said pipe, and means for transmitting to said gage both the pressure of the water upon the inlet side of said closing means when said pipe is wholly closed, and upon the outlet side of said closing means when said pipe is partially closed, substantially as described.

4. The combination, with a pipe, as 1, of an indicating apparatus and a testing-cock provided with means, substantially as described, by which the statical, the dynamical, and the house pressures of the water can be respectively transmitted to said indicating apparatus.

5. The combination, with a service-pipe, as 1, of a shell, as 2, having inlet and outlet ports 7 8, and a plug, as 3, having a main duct, as 9, a second duct, as 48, and a vertical duct, as 12, the parts being so arranged that the water can be shut off from or allowed to flow through the duct 9, and that the duct 48 can be made to communicate with either or both of the ports 7 8 without opening the duct 9, substantially as described.

6. The combination, with a testing-cock and means for turning the same, of the adjustable index 39, substantially as described.

In testimony whereof I have hereunto set my hand in the presence of two subscribing witnesses.

BENJ. S. CHURCH.

Witnesses:
A. N. JASBERA,
J. A. HOVEY.